United States Patent
Goldstein

(10) Patent No.: US 6,663,297 B1
(45) Date of Patent: Dec. 16, 2003

(54) PHOTON WELDING OPTICAL FIBER WITH ULTRA VIOLET (UV) AND VISIBLE SOURCE

(75) Inventor: Mark K. Goldstein, Del Mar, CA (US)

(73) Assignee: Quantum Group Inc., San Diego, CA (US)

( * ) Notice: Subject to any disclaimer, the term of this patent is extended or adjusted under 35 U.S.C. 154(b) by 0 days.

(21) Appl. No.: 09/916,418

(22) Filed: Jul. 26, 2001

Related U.S. Application Data

(60) Provisional application No. 60/221,060, filed on Jul. 27, 2000.

(51) Int. Cl.[7] ............................................. G02B 6/255
(52) U.S. Cl. .................................... 385/97; 385/95
(58) Field of Search ................................... 385/95–97

(56) References Cited

U.S. PATENT DOCUMENTS

| | | | |
|---|---|---|---|
| 4,580,874 A | * | 4/1986 | Winter et al. ................. 385/99 |
| 4,776,895 A | | 10/1988 | Goldstein |
| 4,793,799 A | | 12/1988 | Goldstein et al. |
| 4,906,178 A | | 3/1990 | Goldstein et al. |
| 4,990,789 A | | 2/1991 | Uesaki |
| 5,281,131 A | | 1/1994 | Goldstein |
| 5,285,516 A | * | 2/1994 | Wong ........................ 385/97 |
| 5,356,487 A | | 10/1994 | Goldstein et al. |
| 5,367,140 A | * | 11/1994 | Jouaneh et al. ......... 219/121.64 |
| 5,400,765 A | | 3/1995 | Goldstein et al. |
| 5,500,054 A | | 3/1996 | Goldstein |
| 5,503,685 A | | 4/1996 | Goldstein |
| 5,557,697 A | * | 9/1996 | Yoshie ........................ 385/99 |
| 5,686,368 A | | 11/1997 | Wong |
| 5,840,147 A | | 11/1998 | Grimm |
| 5,843,265 A | | 12/1998 | Grimm |
| 6,072,811 A | * | 6/2000 | Fermann et al. ............. 372/11 |

\* cited by examiner

*Primary Examiner*—Georgia Epps
*Assistant Examiner*—M. Hasan
(74) *Attorney, Agent, or Firm*—Christie, Parker & Hale, LLP

(57) ABSTRACT

A device for welding together optical fiber, constructed and put into practice, according to the principles of this invention, comprises a photon source capable of transmitting photons to at a desired waveband to a desired target, e.g., a solid state part, a fiber optic cable, or a optical waveguide. The desired target, e.g., the end of an optical fiber, comprises a photon absorber material that is designed to absorb the photons emitted by the photon source. Through exposure of the photons emitted from the photon source, the absorber is caused to melt within a very short period of time for a defined period of time, during which time the desired target parts are joined and welded together. Ideally, the photon absorber material is matched to absorb photons in the same waveband as that emitted by the photon source. The device is configured to efficiently produce, focus, and deliver photons to the target area for welding.

34 Claims, 4 Drawing Sheets

PHOTON WELDING OPTICAL FIBER WITH ULTRA VIOLET (UV) AND VISIBLE SOURCE

CROSS-REFERENCE TO RELATED APPLICATIONS

Figure 1:
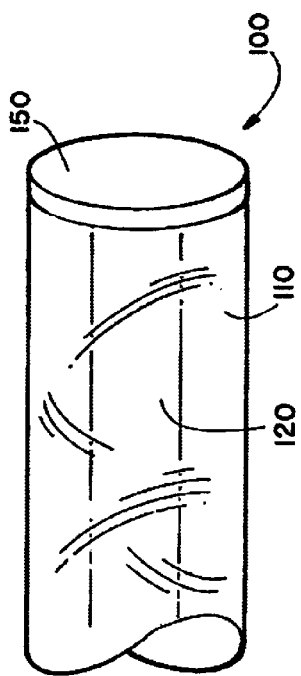

This application claims the benefit of U.S. Provisional Application 60/221,060, filed Jul. 27, 2000.

BACKGROUND

In 1995 Y. S. Chen and A. Benatar, SPE ANTEC Tech. Paper, 1235 and 1248 reported using electric lamps to heat one material and then press them together after removing the light. Robert Grimm improved this process by using filters to make the process more selective (Private Communication Edition Welding Institute (EWI) Materials Joining Technology, 1250 Arthur Adams Dr., Columbus, Ohio 432212, July, 1998).

There are many books and many patents describing photon sources such as laser and other photon emitter technology such as T. H. Maiman in Nature 187, 493 (1960) and the CRC Handbook of Lasers entitled Selected Data on Optical Technology Edited by Robert J. Pressley, published by the Chemical Rubber Co. Cleveland, Ohio, 44128. A classic paper is by J. E. Geusic, H. M. Marcos, L. G. Van Uitert (App. Phys. Lett. 4, 182,1964).

Through-Transmission infrared (TTIR) welding is a non-contact welding process that uses photons that are transmitted through one piece and absorbed by the other. This Through-Transmission Photon (TTP) welding process only requires access to one side of the fiber to be welded as the light will penetrate from the outer edge through the fiber to the farther edge. Mirrors can be used to recycle some of the photons. TTP may incorporate dopant that absorb photons in the any region such as the IR, visible or UV regions.

TTP has advantages for welding optical materials. Items that could be damage by a torch or general electrical heating are difficult to weld such as fiber optic cable because the cladding and core are disrupted.

Welding of plastics are described in patents such as those by R. Grimm U.S. Pat. Nos. 5,840,147 and 5,843,265, and in Goldstein and Tolley Patent Applications 60/116,575 filed Jan. 21, 1999 and Ser. No. 09/488,887 filed Jan. 21, 2000. The information from these earlier patents and patent applications are herein incorporated by reference.

There are a number of ways of producing UV sources, several of which are discussed in two U.S. Pat. Nos. 5,334,913 issued 1994 by Ury and 4,990,789 issued 1991 by Useaki. In addition, there are a number of selective emitters and methods for making them, which have been described in U.S. Pat. Nos. 5,500,054, 5,686,368 and 6,104,031 and application No. 60/089,176 Filed Jun. 12, 1998 herein incorporated by reference.

SUMMARY OF THE INVENTION

This invention also provides a system to join materials rapidly and economically. Custom masks and or waveguides are not required. In addition, this invention describes the holding means may come in a variety of sizes for welding a wide variety of materials and parts. In addition, this invention describes a novel continuous apparatus and method for welding a variety of parts. The method involves exposing the joint of the parts to a stationary light source in such a way that a uniform photon flux is directed to the weld area averaged over the welding time.

In one embodiment of the invention, an UV source is used for welding the optical fibers, the photons of a selected waveband are carried and directed to the target or to a fiber optic cable or waveguide. The target may include an object such as a solid state part that transmits the selected photon to the photon weld joint. The coating on the ends of the optical fiber absorbs the UV photons. The absorption causes the coating, which contains mostly silica and a selective absorber to melt in the area exposed for a period of time called the weld time. The faster the better for welding as it reduces cost. Faster welding requires high-energy photon beams. The uncoated portion of the optical fiber parts does not absorb enough of the energy to cause damage to the fiber.

Patent Application entitled, Photon Welding Optical Fiber with Ultra Violet (UV) and Visible Sources, incorporates selective emitting devices such as an UV xenon lamp, laser and microwave lamp. There is a selective absorber coupled into or onto the ends of the fiber to be joined. The photons are directed either through the fiber or from a perpendicular position around the circumference of the fiber. A number of optical devices may be used to direct the photons to the target areas while they are held in position by an optical gripper or other means.

The joint to be welded is heated by the photons that are absorbed by the selective absorber such as in the visible, UV or any area of the spectrum that is not in the optical transmission region. The fiber optical cables may be attached to a photon emitter that emits only photons that are absorbed. The absorbers transfer energy to its surrounding causing micro-melting and fusing at the joint, which held under a compressive load. The photons generated sources such as a Xenon flash lamp are directed to the fiber optic cable or waveguide, which in tern guide the intense photon beam to its target.

The joint may be coated or ion Implanted on the fiber ends. The material may consist of any material that absorbs only in regions outside that design for communications or other purpose. These materials may consist of materials that absorb photons in specific regions such as metal oxides. In addition, the fiber ends maybe coated with any selective absorber such as certain transition element and mixture thereof.

Another embodiment of this invention deals with fibers that are doped with a welding absorber. Another method to produce fiber joining of infrared transmissive fibers will use absorbers that are in a different range than the intended transmission. One big advantage of this optical welding over diffusion welding is that the fiber can be of different composition and melting points.

In addition a second coating may be added to enhance the capture of selected photons within the end of the waveguide or an antireflective coating may be employed. A number of coating process maybe employed including a sol-gel process. As long as the optical absorber has a significantly different absorption wave length than that required by the optical cable the device produced would function as designed. In fact, a properly welded joint will have near zero loss. The current connectors have loss of 0.2 or more dB in most useful wavelengths.

Targets (such as fiber ends) may be placed in a gripping device that simply holds each fiber and presses them together. At least one end may be coated with the selected absorber that absorbs the selected wavelengths of the photon welder.

Targets (such as fiber ends) may be placed in a gripping device that simply holds each fiber and press them together. At least one end may be coated with the selected absorber that absorbs the selected wavelengths of the photon welder.

FIELD OF THE INVENTION

The present invention relates to a means to efficiently produce and focus photons and deliver them to a coated optical fiber joint target. The thermal energy generated from the absorption of at least one band of selected photons, which are the result of a special material(s) incorporated within the fiber. The absorber is at least on the ends of the sections to be joined. These sections may have a different composition or melt temperature.

If the source of photons is match with the selective absorber in the coating, then the process may be more efficient. An example of such a system is an UV or blue laser. Other absorbers are in the visible and a blue-green or red laser matched with the appropriate absorber. It is possible to add the absorber to the end of the glass fiber in the form of a silicon oxide doped material. Many other chemical compounds contain an ion that selectively absorbs are feasible such as titanium oxide and cobalt oxide. The key is to have a source that at least has sufficient energy in the appropriate band of the absorber.

The preferred photon source should be capable of producing enough photons in the absorber band to create melting on the very end of the, glass in a short period of time less than 1 second. The photon source should direct the selected photons to the targets such as the optical fiber joint.

Another novel photon source for optical fiber welding is a photon-emitting device, which consists of thermal stimulated superemissive waveguide, which delivers selected photons to the target. Goldstein bases this process on U.S. Pat. Nos. 5,500,054 and 5,503,685. Photon generators that use superemitters to emit radiation and, therefore, generate photons are well known and are disclosed in U.S. Pat. Nos. 4,776,785, 4,793,799, 4,906,178, by one of these inventors. This SELP waveguide system may contain emitter materials such as rare earths or other materials with inner electron shell vacancies that can be thermally stimulated to emit narrow band(s) of photons in desired range for performing useful tasks such as the production of energy. Many embodiments of the SELP which is used herein to pump lasers are disclosed in U.S. Pat. Nos. 5,500,054, 5,503,695 and a co-pending application serial No. 60/034,739; Filed Jan. 10, 1997 which are hereby incorporated by reference. These thermally simulated sources may be slower than laser and flash lamps as the photon intensity is much lower.

This invention includes a variety of photon emitters such as lasers, lamps and SELP. The invention includes a means to direct the photons of interest to the target area. The invention includes a means to incorporate a selected absorber in the weld area. The invention also includes method to apply the absorber to the weld. In addition, the invention includes the method of welding with photons such that the fiber joint does not have losses in the designed wavelength region, which must be outside the range of the absorber ions.

BACKGROUND OF THE INVENTION

In the 1950 the use of solid state ruby laser demonstrated the potential of transition metal optical stimulated superemission (T. H. Maiman—Nature 187, 493 (1960)). This laser is red and can operate with a red absorber such as Corning colored filters that transmit in the IR but absorb in the visible Glass Nos. 2540, 2550 and 2600 (e.g. red absorbing blue glasses 5030, 5031 and 4784. In 1964 the rare earth optical stimulated superemitters Nd doped YAG was discovered (J. E. Geusic, H. M. Marcog and L. G. Van Uitert (App.) Phys. lett. 4, 182 [1964]). This Nd YAG technology is in wide use today and is being continuously improved. This 1-micron will match well to ytterbium ion coating. By the 1970's solid state diode laser entered a period of mass commercialization; however, few have the power to weld until recently. The new advanced laser diode array may be useful for welding.

The embodiments of the photon welding patent disclosed in earlier identified U.S. patents and U.S. Patent applications do not promote the efficient generation and collection of selected photons within the fiber ends to be joined. The fiber ends are heated on a nano-scale to form a near zero loss waveguide for delivery of a range of wavelengths other than that of the absorber.

In the above-discussed embodiments, the absorption of selected photons is effected through application of a welding photon sources such as an electric lamp, SELP or laser, which passes photons to the absorber in a nano-scale region at the fiber ends, which is smaller than the wavelength of photons. This very small nano-scale region of the weld is one reason that weld does not degrade the near zero loss of the fiber.

The technology related to the SELP was previously described in an earlier Patent Application Serial No. 60/011, 323 filed Feb. 8, 1996 and U.S. Pat. Nos. 5,711,661 and 5,662,737 herein incorporated by reference. At least one component of the SELP is a material with an inner electron shell hole such as a rare earth element. Other combustion driven devices (e.g., chromium incorporated into a transparent host (such as sapphire), ceria incorporated into thoria, and may other as described in U.S. Pat. Nos. 4,776,895, 4,793,799, 4,906,178, 5,281,131, 5,356,487, 5,400,765, 5,503,685 and 5,500,054 (herein incorporated by reference) then the SELP will emit selected photons to a target.

The fiber communication field is exploding because the fiber can carry data without error. New fiber compositions are being developed that must be welded to existing fiber. As the demand for more error-free data transmission is created by the need for high-speed real time Internet audio and video the answer is more complex wave mixing and more wavelengths. This becomes economically feasible if a zero loss low-cost joining method is developed. This invention is just the method needed. It is, therefore desirable that a device is constructed to weld or facilitate the economic joining of fibers even though these fibers might not be the same.

It is also desirable that the welding device and method be capable of being manufactured from conventional materials using low cost manufacturing techniques. It is also very desirable for this unit to be low cost, lightweight and compact as well as energy efficient. The ability to operate directly from the available electric and heat sources.

The Photon Fiber Welder described in this invention meets these desirable features and therefore will be particularly useful in both military and civilian applications.

LIST OF FIGURES

FIG. 1 Fiber coated on the end with a nano-scale coating containing a selected absorber.

Figure 2:
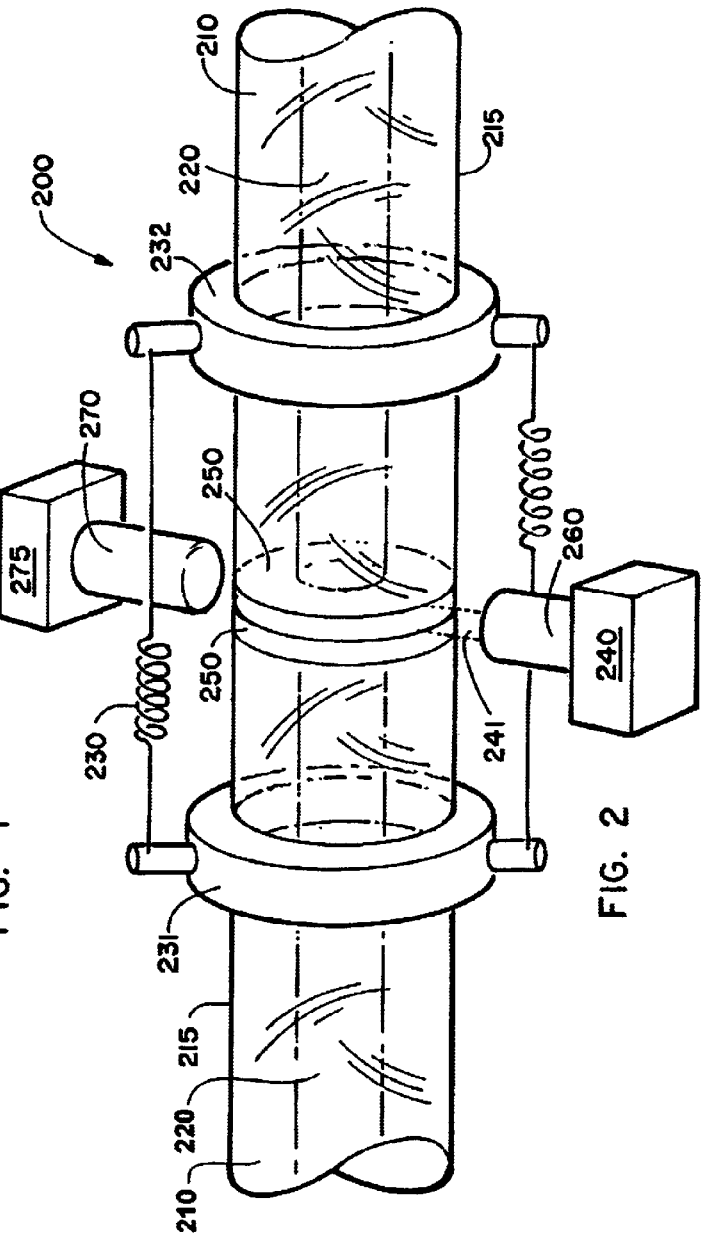

FIG. 2 Detailed view of a laser source welding an optical fiber joint from a plane perpendicular to the fiber.

Figure 3:
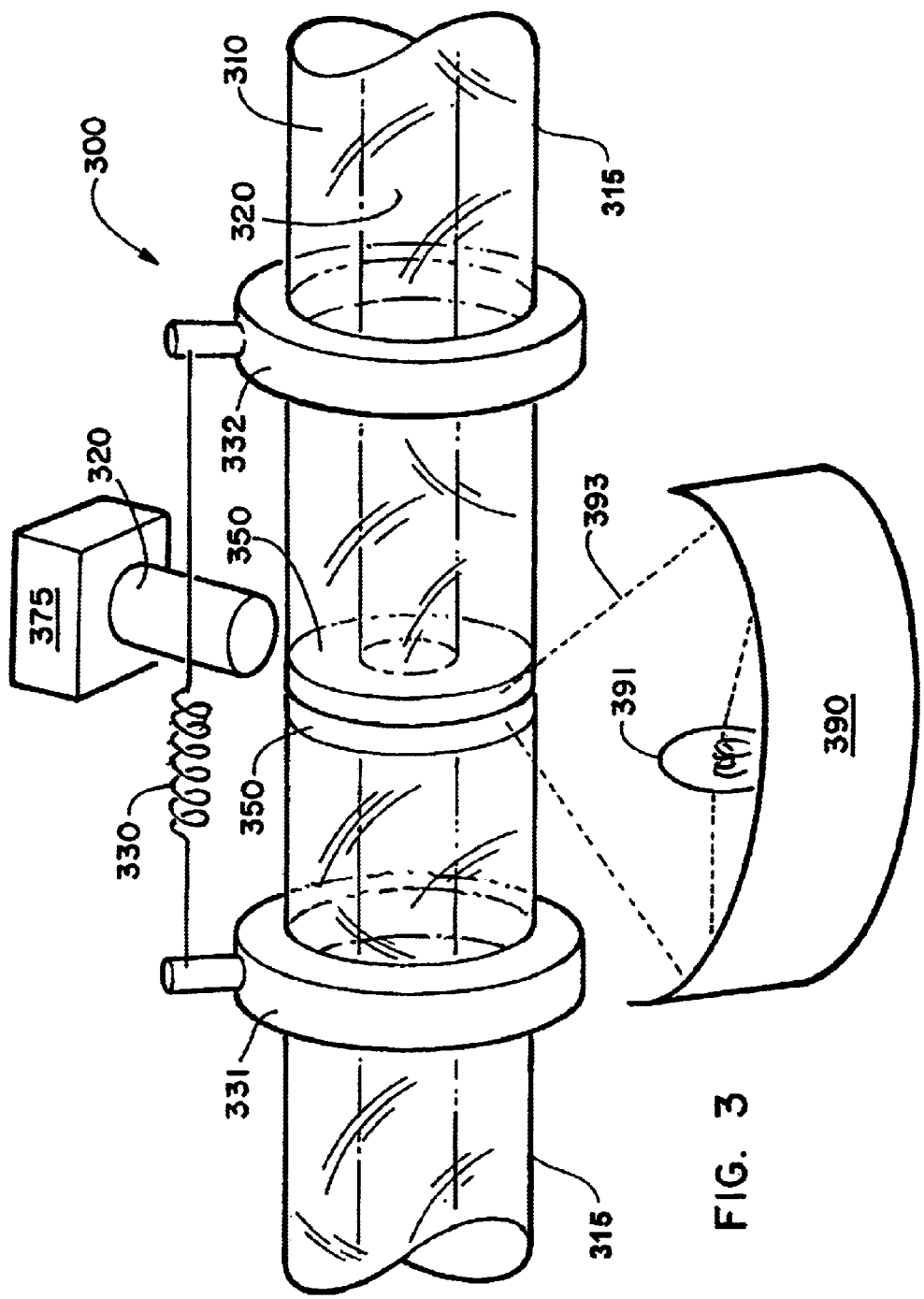

FIG. 3 View of a lamp welding system comprising an electric photon source.

Figure 4:
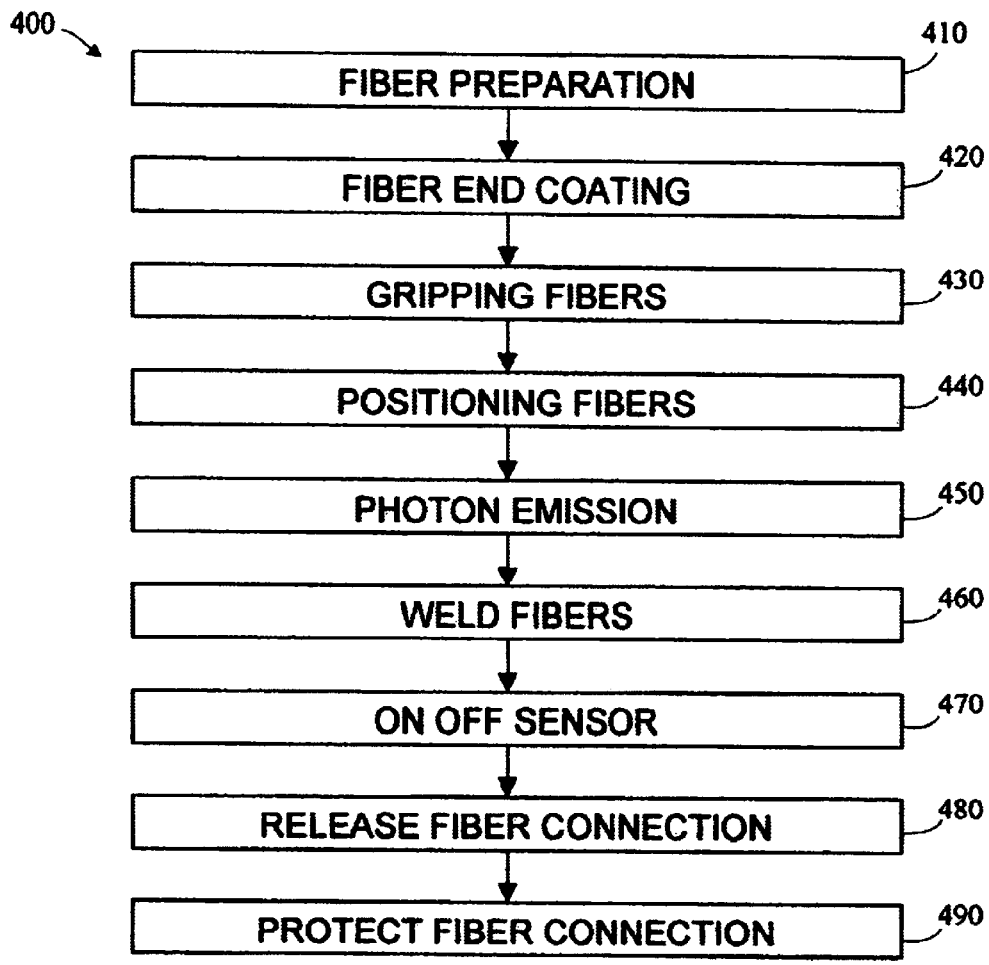

FIG. 4 A flow chart illustrating a method for joining optical fibers with a near zero loss.

Figure 5:
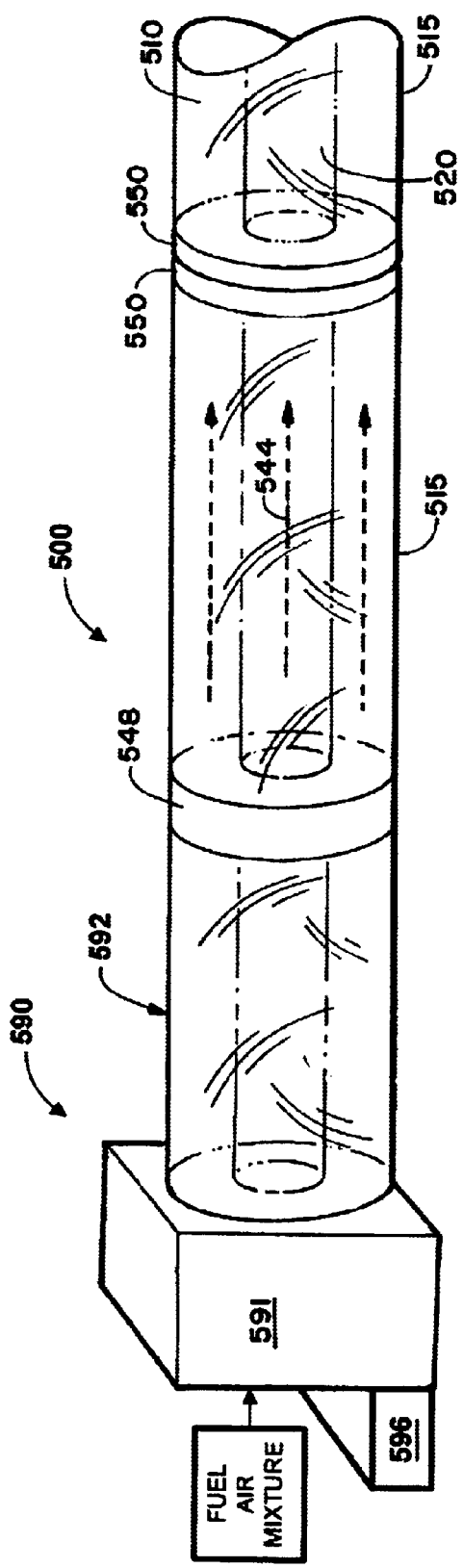

FIG. 5 Illustrates a welding method with a SELP photon emitter using the fiber as the photon guide.

DETAILED DESCRIPTION OF THE INVENTION

FIG. 1 illustrates a fiber 100 that is coated with a nano-scale layer of a selective photon absorber 150, which provide the joint to be formed. The cladding is 110 and the core is 120. Two fibers held together under a load may be welded by first heating the absorber 150 selectively with a photon source.

FIG. 2 illustrates welding system 200 comprising a laser photon source 240 that is used to weld certain types of modified optical fibers 215, each with cladding 310 and core 320. The joint area is define by the two nano-scale glass coatings 250, which are heated to a near liquid state by the laser 240 that emits a wavelength that matches that of the absorber in the coating 250. Photons 241 may be delivered via a waveguide 240. The fibers are gripped by some means such as 232 and held under load by some means such as a spring system 230. The temperature of the melt may be measured by a temperature probe 270, which part of a temperature instrument 275, during the laser emissions to verify the proper temperature and to remove the heat at the proper time by shutting off the laser. FIG. 2 shows a typical laser welding the setup needed to create a near zero dB loss connection of modified optical fibers.

The formation of a very thin non-absorbing layer connecting the two fibers allows all the communication wavelengths to pass without any loss.

FIG. 3 illustrates a lamp welding system 300 comprising an electric photon source 390 that is used to weld certain types of modified optical fibers 315. The fiber joint area, defined by the two nano-scale glass coatings 350 on the end of each of the fibers 315, are very important to the weld. These coatings may be applied by a sol-gel coating method define in several earlier patents dealing with the application of superemitters to a SELP, CVD, or other suitable method (not shown). The coating are heated up to a near liquid state by a lamp 391 that emits a wavelength that matches that of the absorber in the coatings 350. The fibers are gripped by some means such as 331 and 332 and held under load by some means such as a spring system 330. The temperature of the melt may be measured by a temperature probe 320, which is part of a temperature instrument 375, during the lamp emissions to verify the proper temperature and to remove the heat at the proper time by shutting off the lamp. FIG. 3 shows a typical lamp welding the setup needed to create a near zero dB loss connection of modified optical fibers. The formation of a very thin non-absorbing layer connecting the two fibers allows all the communication wavelengths to pass without any loss.

FIG. 4 illustrates a flow chart 400 of the optical fiber joining process.

1. The first step is to prepare the fiber for the welding process by removing some of the materials cable.
2. Next the fiber is coated with the selective absorber.
3. Next each fiber is held under load by a gripper.
4. Next the welder is positioned to start the welding.
5. Next the Photons are emitted.
6. Next the material softens and the weld occurs
7. Next the Photon are shut off
8. Next the pressure is released
9. Next a protective section is added FIG. 5 illustrates a photon fiber joining system 500 similar to FIG. 2 except that the light source may be a SELP emitter system 590 with a SELP 592. In the case of combustion gases an igniter 596 is provided. Fuel/air mixture enters a combustion device 591 The combustion is ignited and then the heat generates photons 544 within the SELP 592, which are directed to the target through an optical couple transfer mechanism 548 through the fiber optic fibers 515. The nature of the ultra-thin absorber coating 550 suggests that a shorter wavelength absorber such as blue or UV should be employed.

The examples above are not intended to limit the scope of this invention, the novel use of SELP Pumped laser stimulation by means of superemitter materials within or adjacent to any type of waveguide for producing any selected photon sources for laser purpose is within the claims of this invention.

What is claimed is:

1. A device that welds optical fibers with a near zero loss in the near infrared, comprising:
    an absorber that absorbs photons in the visible and/or ultra violet (UV) and transmits in the near IR; a visible and/or UV photon source that excites the absorber such that it melts to form a weld; and
    means to hold the fibers during welding and for a period for the weld to cool.

2. A device as claimed in claim 1, wherein the photons are absorbed by the absorber at an end of the fibers to be joined and further comprising means to carry the photons to a joint.

3. A device as claimed in claim 2, whereby the photon source is perpendicular to a fiber axis.

4. A device is claimed that welds optical fibers with a near zero loss in the near infrared, comprising:
    an absorber that absorbs photons in the visible and/or ultra violet (UV) and transmits in the near IR;
    a visible and/or UV photon source that excites the absorber such that it melts to form a weld;
    means to hold the fibers during welding and cooling of the weld;
    whereby the absorber is coated onto ends of the fibers to be joined with a thickness of a coating less than a wavelength of 1.2 microns.

5. A device as claimed in claim 4 wherein the photon source comprises a selective emitter that matches the absorber and provides a means to deliver selected wavelength photons to a target in the photon flux needed to weld in less than one second.

6. A device as claimed in claim 4 in which the photon source is powered by combustion.

7. A device as claimed in claim 6 where the photon source is a superemissive light pipe (SELP) and an associated waveguide delivers the photons to a surface of an area to be joined containing the absorber.

8. A device as claimed in claim 7 further comprising a section containing solid state ions doped into an end of the waveguide or SELP, and further that a garnet or doped YAG doped with rare earth at the distal end is heated such that it emits the photons to perform the welding by melting the absorber.

9. A device as claimed in claim 4 comprising electricity as a power source for the photon source.

10. A device as claimed in claim 9 wherein the absorber matches the peak of the photon source.

11. A device as claimed in claim 4 comprising a laser as the photon source.

12. A device as claimed in claim 11 wherein the absorber matches the peak of the photon source.

13. A device as claimed in claim 4 comprising a laser as the photon source, whose peak emission is absorbed by the absorber.

14. A device as claimed in claim 4 further comprising means to excite the absorbers by directing the photons through a fiber axis.

15. A device as claimed in claim 4 wherein the absorber comprises an ultra violet absorber and the photon source comprises an UV source.

16. A method to join optical fibers comprising the following:
- prepare the fibers for welding by removing some of the materials around the fibers and then cutting the fibers cleanly,
- apply to the fibers a coating with a selective absorber;
- each fiber is held under load by a gripper;
- a welder is positioned to start the welding;
- photons are emitted;
- the coating softens and a weld occurs;
- the Photons are shut off; and
- the load is released after the weld has cooled.

17. A method of claim 16, further comprising:
- a protective section is placed around the fibers.

18. A method to join optical fibers by coating ends of the fibers with a material that selectively absorbs photons in a wavelength region not intended for use by the optical fibers, and further comprising a photon source that heats the selective material and causes it to weld together when the ends are both coated and held together.

19. A method to join optical fibers by coating ends of the fibers with a material that selectively absorbs photons in a wavelength region not intended for use by the optical cable, and further comprising a photon source that heats the selective material and causes it to weld together when the ends are held together, and further comprising a communication cable design to operate between 1.2 and 1.7 micron region, which further comprises means to heat up the material in the near UV, visible, and or 700 nm to 1.1 nm, and further comprising emitters in one or more of these selected ranges.

20. Optical fiber cables with a photon emitter that comprises holmium ions in ends of the fiber cables to be joined, wherein the photon emitter emits sufficient photons in the 2 micron region to heat up a nano-scale coating on either end of the fiber cables to form a weld and further comprising a means to hold the fiber cables in place under pressure until the weld has cooled.

21. A device that welds optical fibers with a near zero loss in the near infrared, comprising:
- an absorber that absorbs photons in the visible and/or ultra violet (UV) and transmits in the near IR;
- a visible and/or UV photon source that excites the absorber such that it melts to form a weld;
- means to hold the fibers during welding and cooling of the weld;
- means to selectively heat a section of a waveguide for the purpose of welding two fibers so that the welded fibers transmit photons in a region in the near infrared without losses.

22. A system for welding optical fibers, comprising:
- at least two optical fibers having ends;
- a photon source emitting photons of a selected waveband;
- a coating on the ends, the coating containing an absorber that absorbs the photons and melts to form a weld joining the ends; and
- holders holding the fibers with the ends under compressive load during emission of the photons from the photon source and during cooling of the weld.

23. A system of claim 22, wherein the photon source is a laser.

24. A system of claim 22, wherein the photon source is a lamp.

25. A system of claim 22, wherein the photon source is a SELP.

26. A system of claim 22, wherein the selected waveband is other than that intended for use by the optical fibers.

27. A system of claim 22, wherein the photons are directed from the photon source to the absorber in a direction nonparallel with a longitudinal axis of the fibers.

28. A system of claim 22, wherein the photons are directed from the photon source to the absorber along a longitudinal axis of the fibers.

29. A system of claim 22, wherein the photon source is stationary.

30. A system of claim 22, wherein the photon source exposes the absorber to a uniform photon flux of weld area averaged over weld time.

31. A system of claim 22, wherein the device has a weld time of less than one second.

32. A system for welding optical fibers, comprising:
- at least two optical fibers having ends, the ends implanted with an absorber that absorbs a selected waveband;
- a photon source emitting photons of the selected waveband to form the weld; and
- holders holding the fibers with the ends under a compressive load during emission of the photons from the photon source and during cooling of the weld.

33. A system of claim 32, wherein the absorber is a metal oxide.

34. A system of claim 32, wherein the absorber comprises holmium ions.

* * * * *